US007325230B2

(12) United States Patent
Uchida (10) Patent No.: US 7,325,230 B2
(45) Date of Patent: Jan. 29, 2008

(54) SYSTEM FOR COMPILING SOURCE PROGRAMS INTO MACHINE LANGUAGE PROGRAMS, A COMPUTER IMPLEMENTED METHOD FOR THE COMPILING AND A COMPUTER PROGRAM PRODUCT FOR THE COMPILING WITHIN THE COMPUTER SYSTEM

(75) Inventor: Katsuya Uchida, Ota-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 557 days.

(21) Appl. No.: 10/747,210

(22) Filed: Dec. 30, 2003

(65) Prior Publication Data

US 2005/0097523 A1    May 5, 2005

(30) Foreign Application Priority Data

Nov. 5, 2003    (JP)    ............................ P2003-376093

(51) Int. Cl.
*G06F 9/45*    (2006.01)
(52) U.S. Cl. ...................... 717/140; 717/141; 717/142; 717/143; 717/146; 717/151; 717/153; 717/154
(58) Field of Classification Search ......... 717/140–161
See application file for complete search history.

(56) References Cited

U.S. PATENT DOCUMENTS

| 7,039,906 | B1* | 5/2006 | Trelewicz et al. | ........... 717/149 |
| 2004/0025150 | A1* | 2/2004 | Heishi et al. | ................ 717/154 |
| 2005/0097523 | A1 | 5/2005 | Uchida | |

FOREIGN PATENT DOCUMENTS

| JP | 7-134645 | 5/1995 |
| JP | 10-3390 | 1/1998 |
| JP | 11-296359 | 10/1999 |
| WO | WO 03/032157 A1 | 4/2003 |

OTHER PUBLICATIONS

W. Sung et al., "Fixed-Point C Language for Digital Signal Processing", 1996, IEEE.*
M. Coors, "Design and DSP Implementation of Fixed-Point Systems", Aug. 31, 2001.*
"SystemC Version 2.0 User's Guide", Open SystemC Initiative, Chapter 7, http"//www.systemc.org/, 2002, pp. 101-108.
U.S. Appl. No. 11/531,619, filed Sep. 13, 2006, Uchida.
"Hitac, Program Product, VOS1, Optimized PL/I, OPLI E2 Language, Basic Edition, Grammar Book, First edition", Hitachi, Ltd., Mar. 31, 2003, first edition, p. 9-36 (CS-NA-2006-03951-001).

* cited by examiner

*Primary Examiner*—Meng-Al T. An
*Assistant Examiner*—Lilian Vo
(74) *Attorney, Agent, or Firm*—Oblon, Spivak, McClelland, Maier & Neustadt, P.C.

(57) ABSTRACT

A system for compiling source programs into machine language programs, comprising: a data type information processing module configured to analyze a definition statement of a fixed-point data type in a source program, acquire data type information of the fixed-point data type; a type-information storage; a variable information processing module configured to analyze a variable declaration statement of the fixed-point data type, acquire variable information; a variable storage; and a code generating module configured to read arithmetic expression data, acquire the type number, acquire the data type information, convert the arithmetic expression data.

18 Claims, 8 Drawing Sheets

```
#pragma fx_format short : 1, 10  long : 2, 20
    void func ( )  {
    short _Accum x, y, z ;
       .
       .
       .
    x = y + z ;
       .
       .
       .
    }
```

FIG. 7

| TYPE NUMBER | DATA TYPE | SIGN | SIZE | INTEGRAL PART | FRACTIONAL PART |
|---|---|---|---|---|---|
| 1 | fixed | SIGNED | short | 1 | 10 |
| 2 | fixed | UNSIGNED | short | 1 | 10 |
| 3 | fixed | SIGNED | long | 2 | 20 |
| 4 | fixed | UNSIGNED | long | 2 | 20 |

FIG. 8

| VARIABLE NAME | TYPE NUMBER |
|---|---|
| "x" | 1 |
| "y" | 1 |
| "z" | 1 |

FIG. 9

```
mov  R1, R10
mov  R2, R11
mov  R3, 1
mov  R4, 10
jal  ffx_add
mov  R12, R0
```

SYSTEM FOR COMPILING SOURCE PROGRAMS INTO MACHINE LANGUAGE PROGRAMS, A COMPUTER IMPLEMENTED METHOD FOR THE COMPILING AND A COMPUTER PROGRAM PRODUCT FOR THE COMPILING WITHIN THE COMPUTER SYSTEM

CROSS REFERENCE TO RELATED APPLICATION

This application is based upon and claims the benefit of priority from prior Japanese Patent Application P2003-376093 filed Nov. 5, 2003, the entire contents of which are incorporated herein by reference.

BACKGROUND OF THE INVENTION

1. Field of the Invention

This invention relates to compiling technology which converts a high level language, such as C language, to a machine language, especially a system for compiling programs, a method for compiling programs and a computer program product for compiling programs, in which a fixed-point data type can be defined at the start of the compiling operation or during the operation.

2. Description of the Related Art

It is well known that processing in fixed-point data type, instead of a floating point data type, provides resultant data speedily and precisely enough when operating multimedia data including audio and video data.

Most of the prior art compilers cannot directly process the fixed-point data type. Therefore, when the fixed-point data type is operated, the fixed-point data type is converted into the integer data type at an input or an output of a source program, and is processed as the integer data type when operating programs. Alternatively, the fixed-point data is processed by means of a user-defined function by using, for example, the integer data type.

Another compiler for operating the fixed-point data is known in which the compiler's processor has an installed designated circuit for operating the fixed-point data or a circuit for supporting operation (see User's Manual "C compiler for CC77016 μ PD77016", NEC Electric Corp, published on January, 2003, Page 48-Page 51).

A compiler for a system design language "System C", in which hardware can be described by means of a class of a C++ language, can process the fixed-point data type as C++ class. Furthermore the compiler can change the data type. However, even if the compiler can handle fixed-point data, that fixed-point data is tailored to the processor's specification. Also, it is difficult for the compiler, which is for the processor that does not handle fixed-point data by default (i.e. the processor that calculates fixed-point data by instructions which are not for fixed-point operations), or the processor that can add user defined modules can handle fixed-point data, to change the fixed-point data type according to user's requests.

Concretely speaking, as a first problem, in the case that users treat the fixed-point data as the integer data in a program, or users prepare functions which operate fixed-point operations, the term of programming programs becomes longer, the maintainability or reusability become worse because the descriptions for the fixed-point data are same as those of the integer data.

In operating a source program, only the fixed-point data are partially different from the original program, which decreases maintainability and causes difficulty of reusing the program.

As a second problem, the compiler, which is for the processor that can handle the fixed-point data or has the other processor can handle it, can handle the fixed-point data, however, that fixed-point data may have the excessive accuracy because such a fixed-point data type is fixed (i.e. not changed). Then, there is a problem that the performance falls down, or the size of object generated by the compiler becomes bigger.

As a third problem, the operations of C++ class objects are compiled to function calls by a C++ compiler, so fixed-point operations in a System C program are also compiled to function calls. Therefore, even if the processor has instructions which can handle fixed-point data, the compiler cannot generate them for the fixed-point operations.

SUMMARY OF THE INVENTION

A first aspect of the present invention inheres in a system for compiling source programs into machine language programs, comprising: (A) a data type information processing module configured to analyze a definition statement of a fixed-point data type in a source program, acquire data type information of the fixed-point data type, including at least one of a type number, a data type, a sign, a data size, a number of bits in the integral part and fractional part; (B) a type-information storage unit configured to store the data type information; (C) a variable information processing module configured to analyze a variable declaration statement of the fixed-point data type, acquire variable information including a variable name and the type number as an analysis result; (D) a variable storage unit configured to store the variable information; and (E) a code generating module configured to read arithmetic expression data including the variable in the source program, acquire the type number corresponding to the variable from the variable storage unit, acquire the data type information corresponding to the type number from the type-information storage unit, convert the arithmetic expression data including the data type information into machine language of the function calling instruction or the fixed point arithmetic instruction installed in a processor.

A second aspect of the present invention inheres in a computer implemented method for compiling source programs into machine language programs, comprising: (A) analyzing a definition statement of a fixed-point data type in a source program, acquiring data type information of the fixed-point data type including at least one of a type number, a data type, a sign, a data size, a number of bits in the integral part and fractional part, and storing the data type information in a type-information storage unit; (B) analyzing a variable declaration statement of the fixed-point data type, acquiring variable information including a variable name and the type number as a result of the analyzing, and store the variable information in a variable storage unit; and (C) reading arithmetic expression data including the variable in the source program, acquiring the type number corresponding to the variable from the variable storage unit, acquiring the data type information corresponding to the type number from the type-information storage unit, converting the arithmetic expression data including the data type information into machine lauguage of a function calling instruction or the fixed point arithmetic instruction installed in a processor.

A third aspect of the present invention inheres in a computer program product for compiling source programs into machine language programs within a computer system, the computer program product comprising: (A) an instruction configured to analyze a definition statement of a fixed-point data type in a source program, acquire data type information of the fixed-point data type, including at least one of a type number, a data type, a sign, a data size, a number of bits in the integral part and fractional part, and store the data type information in a type-information storage unit; (B) an instruction configured to analyze a variable declaration statement of the fixed-point data type, acquire variable information including a variable name and the type number as a result of the analyzing, and store the variable information in a variable storage unit; and (C) an instruction configured to read arithmetic expression data including the variable in the source program, acquire the type number corresponding to the variable from the variable storage unit, acquire the data type information corresponding to the type number from the type-information storage unit, convert the arithmetic expression data including the data type information into machine language of a function calling instruction or the fixed point arithmetic instruction installed in a processor.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of a system for compiling data, it will be appreciated that the various drawings are not drawn to scale from one figure to another nor inside a given figure.

In the following descriptions, numerous specific details are set forth such as specific signal values, etc. to provide a throughout understanding of the present invention. However, it will be obvious to those skilled in the art that the present invention may be practiced without such specific details.

(System for Compiling Programs)

Figure 2:
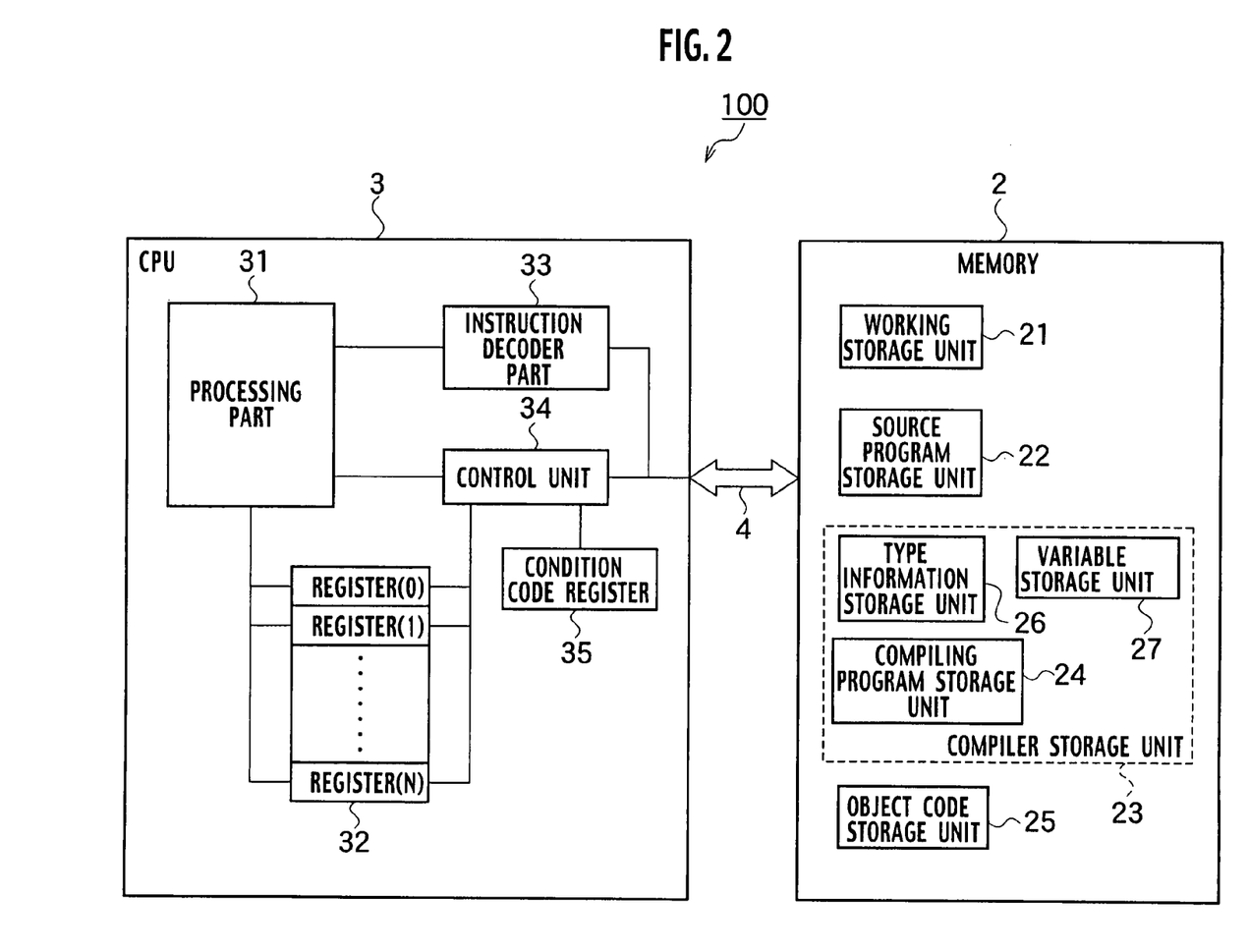
FIG. 2 is a function block diagram of a compiling system according to an embodiment of the present invention.

A compiling system 100 according to an embodiment of the present invention is formed, for example, as shown in FIG. 2. The compiling system 100 has a memory device 2 and a Central Processing Unit (CPU) 3. Referring to FIG. 2, the CPU 100 is coupled to the memory device 2 by a system bus 4.

The memory 2 has a working storage unit 21, a source program storage unit 22, a compiler storage unit 23 and an object code storage unit 25. The compiler storage unit 23 has a compiling program storage unit 24, a type-information storage unit 26 and a variable storage unit 27, and the like.

The working storage unit 21 is a memory to be used during arithmetic processings. The source program storage unit 22 stores a source program described by a high-level language program, e.g, C language. The compiling program storage unit 24 stores a compiling program to perform compiling processing. The object code storage unit 25 stores compiled object codes.

Figure 7:
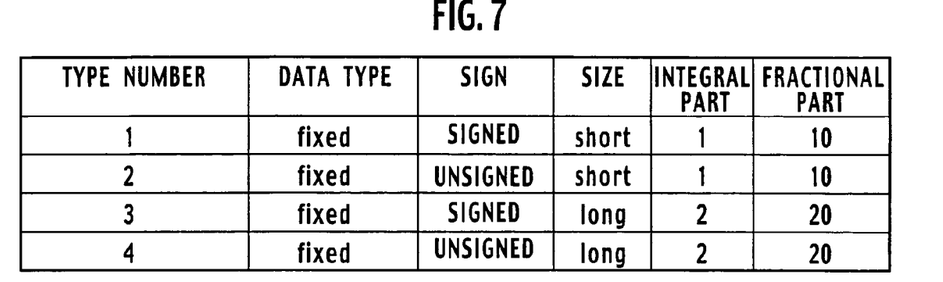
FIG. 7 is a data configuration in a type-information memory.
Figure 8:
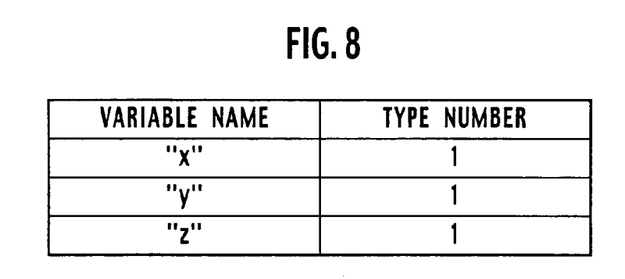
FIG. 8 is a data configuration in a variable memory.

As shown in FIG. 7, the type-information storage unit 26 stores data-type information such as a type number, a data type, a sign, the size, an integral part and a fractional part, and the like. As shown in FIG. 8, the variable storage unit 27 stores information such as a variable name and a type number, and the like. Each variable is indexed by a type number and is linked to information stored in type-information storage unit 26 in FIG. 7.

CPU 3 has a processing part 31, a plurality of registers 32, an instruction decoder part 33, a control unit 34 and a condition code register 35.

A condition code register 35, the same as a flag register, has condition codes, which are set according to an arithmetic result. A condition code expresses the result of an arithmetic instruction such as a magnitude relation of a pair of values when arithmetic or comparison instructions are executed. An arithmetic instruction sets codes to express an instruction of magnitude according to the arithmetic result. A comparison instruction sets a code to express a magnitude relation of an operand pair.

CPU 3 loads compiling programs in the compilation program storage unit 24, executes some arithmetic operation, which compiles source programs into machine language programs. The compilation program specifically includes a lexical analysis module 11, a syntax analysis module 12, a code generating module 15 and a code optimizing module 16, shown in FIG. 1.

Figure 1:
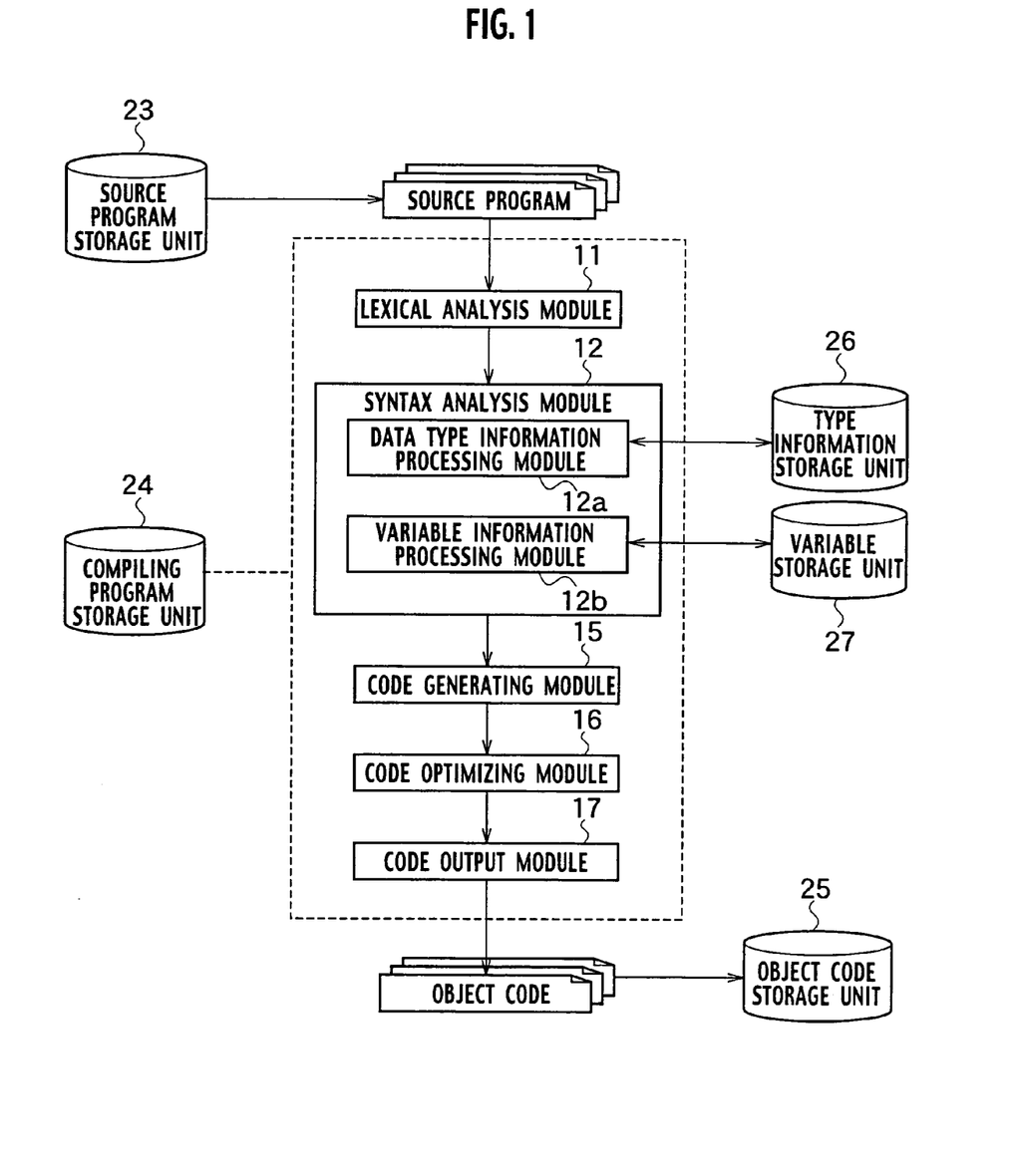
FIG. 1 is a structure of a compiling system according to an embodiment of the present invention.

The lexical analysis module 11 analyzes lexical token of a source program. The syntax analysis module 12 analyzes whether the lexical analysis result is syntactically correct or not, and also analyzes compiler directives for providing the data size, the integral-part bit number and the fractional-part bit number. The syntax analysis module 12 has a data type information processing module 12a and a variable information processing module 12b.

The data type information processing module 12a analyzes a declaration statement, such as the fixed-point data type in a source program, defines a type number of the fixed-point data type, the variable size, an integral-part bit number and a fractional-part bit number, and stores this data into the type-information storage unit 26.

Figure 6:
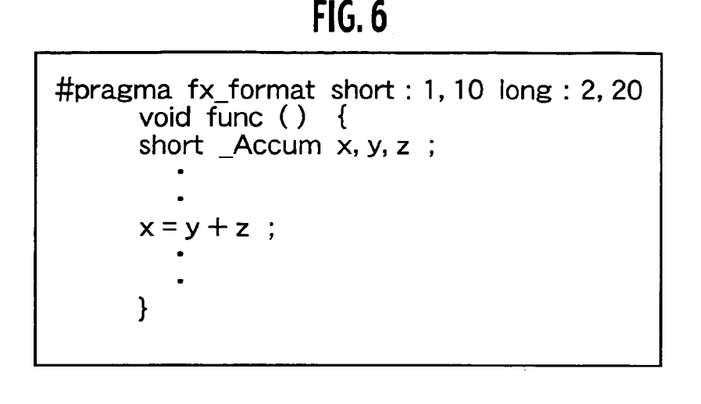
FIG. 6 is an example of a program performed in an embodiment of the present invention.

The variable information processing module 12b, analyzes, for example, a variable declaration statement of the fixed-point type data in a source program on the third line of FIG. 6, stores information of a variable name and a type number into variable storage unit 27 of FIG. 8.

The code generating module 15 acquires data type information, for example a variable size, an integral-part bit number and a fractional-part bit number, from type-information storage unit 26, converts operation data into machine language, for the library function calling instruction installed in a compiler or the fixed point arithmetic instruction in a processor.

The code optimizing module 16 modifies generated codes for increasing the speed to execute operations. The code output module 17 outputs an optimized code as an object code.

(Method for Compiling)

Figure 10:
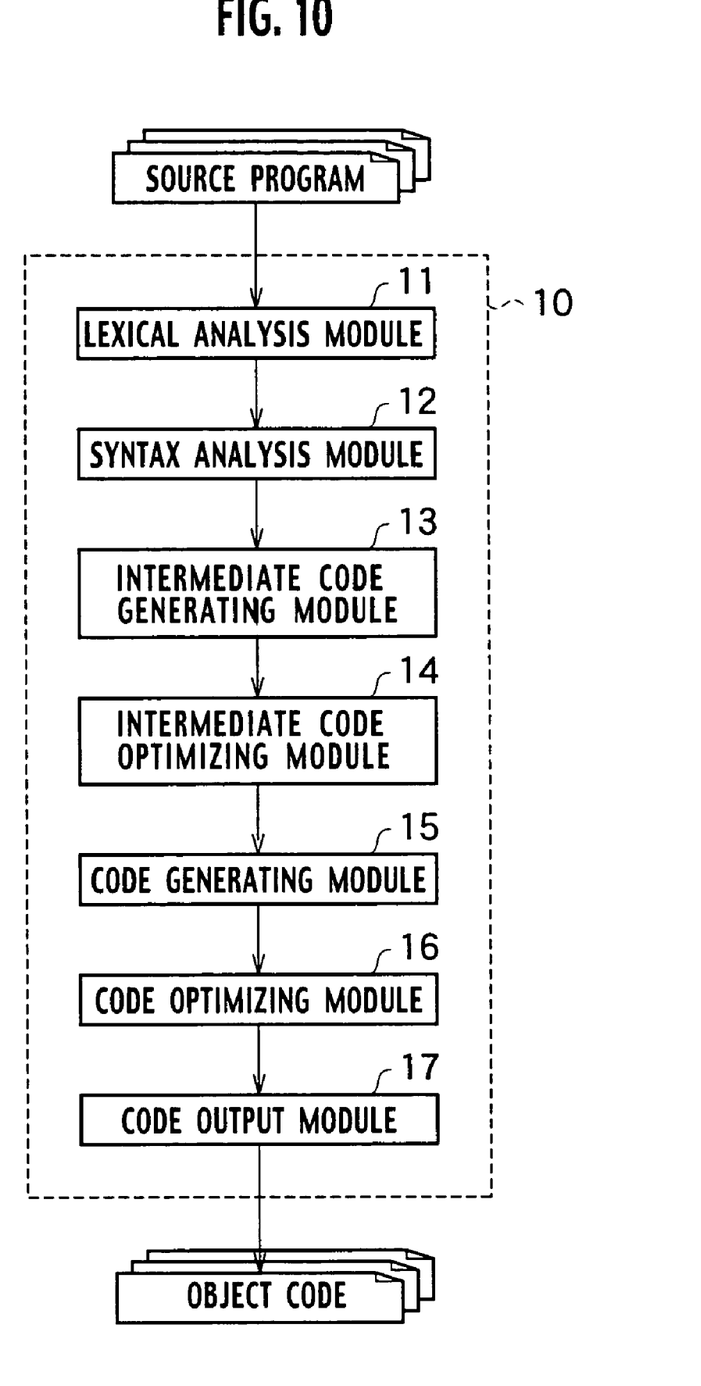
FIG. 10 is a function block diagram of a compiling system according to an embodiment of the present invention.

A compiling system according to an embodiment of the present invention converts a source program into an object code (object program) of a machine language, along processing arrows of FIG. 1. In an operation of FIG.1, a source program is converted into a machine-language object code directly without interlay replacing with an intermediate code, that is a simple machine language for a CPU. The source program can be replaced with the intermediate code as shown in FIG. 10, which improves efficiency of optimization.

An operation example in which a source program of FIG. 6 is compiled according to the procedure of FIG. 1 is described as follows.

(a) When compiling the source program of FIG. 6 that declares the fixed-point type data, the lexical analysis module 11 reads a compiler directive shown in the first line of FIG. 6, $$\text{\# pragma fx\_format short: 1,10 long: 2,20} \tag{1}$$

and the lexical analysis module 11 aquires the declared fixed-point type data.

Figure 3:
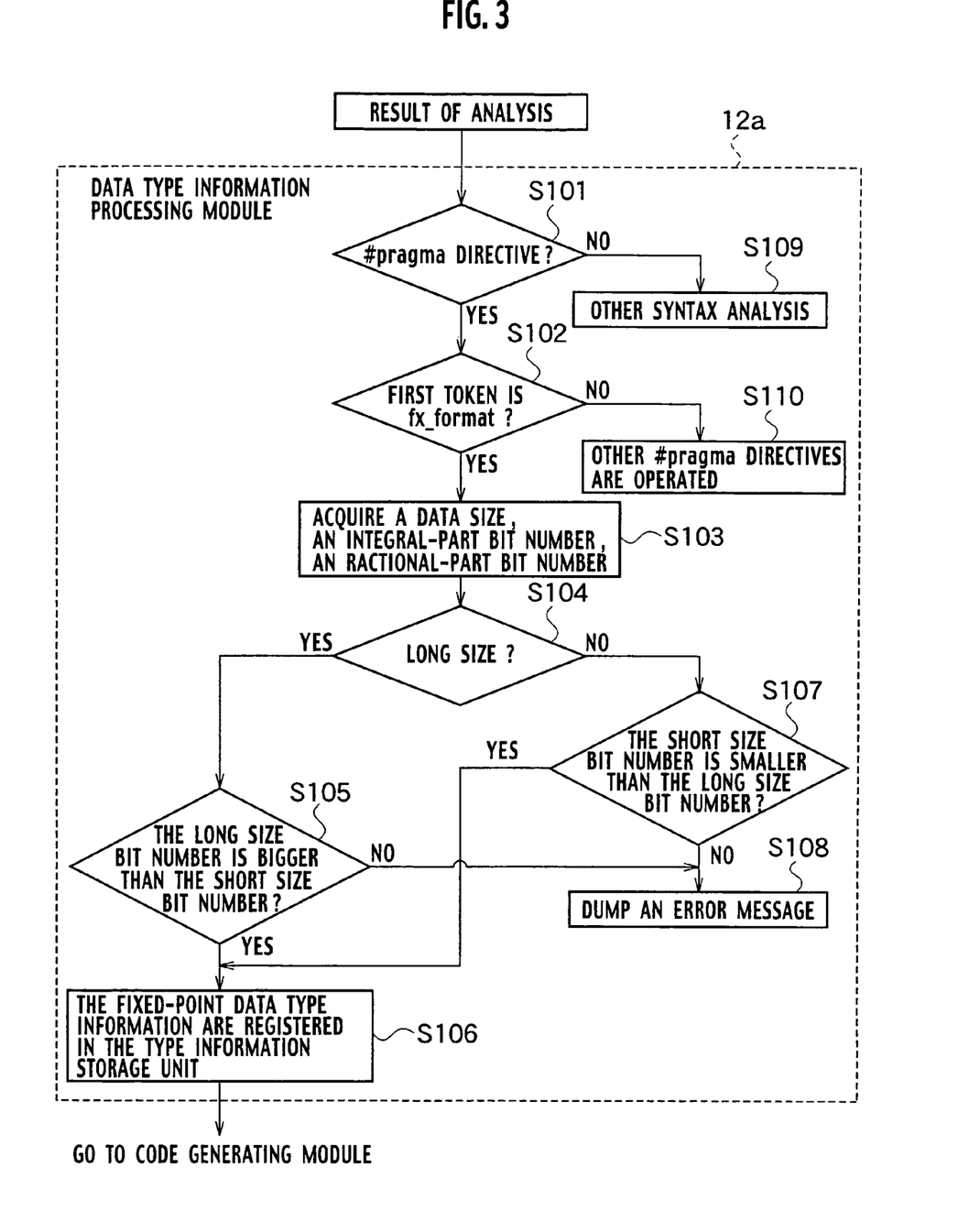
FIG. 3 is a flow chart showing an operation in which data type information processing module processes a #pragma directive.

(b) As shown in FIG. 3, the data type information processing module 12a of syntax analysis module 12 acquires an analysis result from the lexical analysis module 11, and determines whether the result is a #pragma directive or not in step S101.

If the result is the #pragma directive, the program proceeds to step S102. On the other hand, if the result is not the #pragma directive, other syntax analysis is performed in step S109.

In step S102, the data type information processing module 12a determines whether the type is the fixed-point data type definition or not, for example, whether the first token is described "fx_format". If the token is fx_format, the program proceeds to step S103. On the other hand, if the token is not fx_format, other #pragma directives are performed in step S110.

In step S103, the data type information processing module 12a acquires data size, an integral-part bit number and a fractional part bit number from the definition.

In step S104, the data type information processing module 12a determines whether the data size is long or not. If the data size is long, the program proceeds to step S105, meanwhile, if the data size is short, the program proceeds to step S107.

In step S105, the data type information processing module 12a compares the short size bit number to the long size bit number stored in the memory 2, and inspects or determines if the long size bit number is bigger than the short size bit number. If an inspection or determination error is not detected, the program proceeds to step S106. If an inspection or determination error is detected, an error message is dumped in step S108.

In step S107, the data type information processing module 12a compares the long size bit number stored in the memory 2 to the short size bit number, inspects or determines if the short size bit number is smaller than the long size bit number. If an inspection or determination error is not detected, the program proceeds to step S106. If the inspection or determination error is detected, an error message is dumped in step S108.

In step S106, a loaded compiler-directive data size, a loaded integral-part bit number and a loaded fractional-part bit number are registered in the type-information storage unit 26 of FIG. 7. In addition, the two data types for the one data size fixed-point are registered, one is signed, the other is unsigned fixed-point data type.

Figure 4:
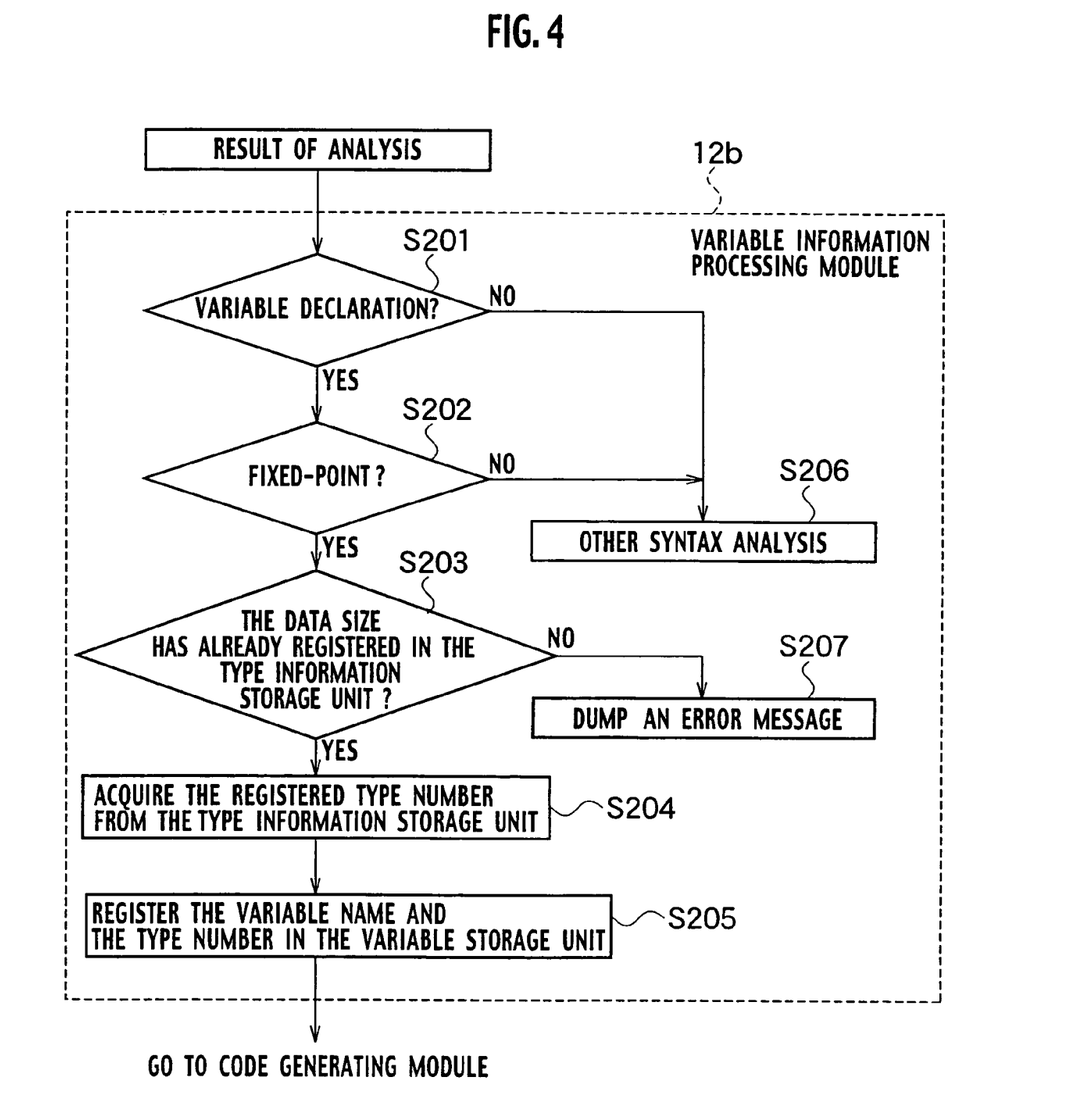
FIG. 4 is a flow chart showing an operation in which the variable information processing module processes a variable definition sentence of the fixed-point.

(c) An operation, shown in FIG. 4, of the variable information processing module 12b is explained as follow.

In step S201, the CPU 3 loads a function definition of the second line, and next the variable declaration of the third line:

$$\text{short\_Accum x,y,z} \tag{2}$$

In step S202, the variable information processing module 12b determines whether the loaded variable is the fixed-point or not. If the loaded variable is the fixed-point, the program proceeds to step S203, if the loaded variable is not the fixed-point, the loaded variable is transferred to other syntax analysis modules in step S206.

In step S203, the variable information processing module 12b examines whether the data size has already been registered in the type-information storage unit 26 of FIG. 7, in a procedure of step S101 . . . S110 of FIG. 3. If the data size is registered in the type-information storage unit 26, the program proceeds to step S204. If the data size is not registered in the type-information storage unit 26, an error message is dumped in step S207.

In step S204, the variable information processing module 12b acquires the registered type number from the type-information storage unit 26. In step S205, the variable name and the type number that relates to the type-information storage unit 26 are registered in variable storage unit 27 of FIG. 8.

(d) The code generating module 15 receives a sentence of an intermediate code optimized result or a parsed sentence, determines whether the sentences expresses an arithmetic expression including the fixed-point data type variable or not.

When a sentence including the fixed-point type data variable is operated, the code generating module 15 confirms from a variable's type number in the arithmetic expression that some fixed-point variable is included in the arithmetic expression and the arithmetic expression can deal with the fixed-point variable. The code generating module 15 also acquires data type information, such as a variable size, a bit number of an integral part and a bit number of a fractional part from type-information storage unit 26.

Figure 5:
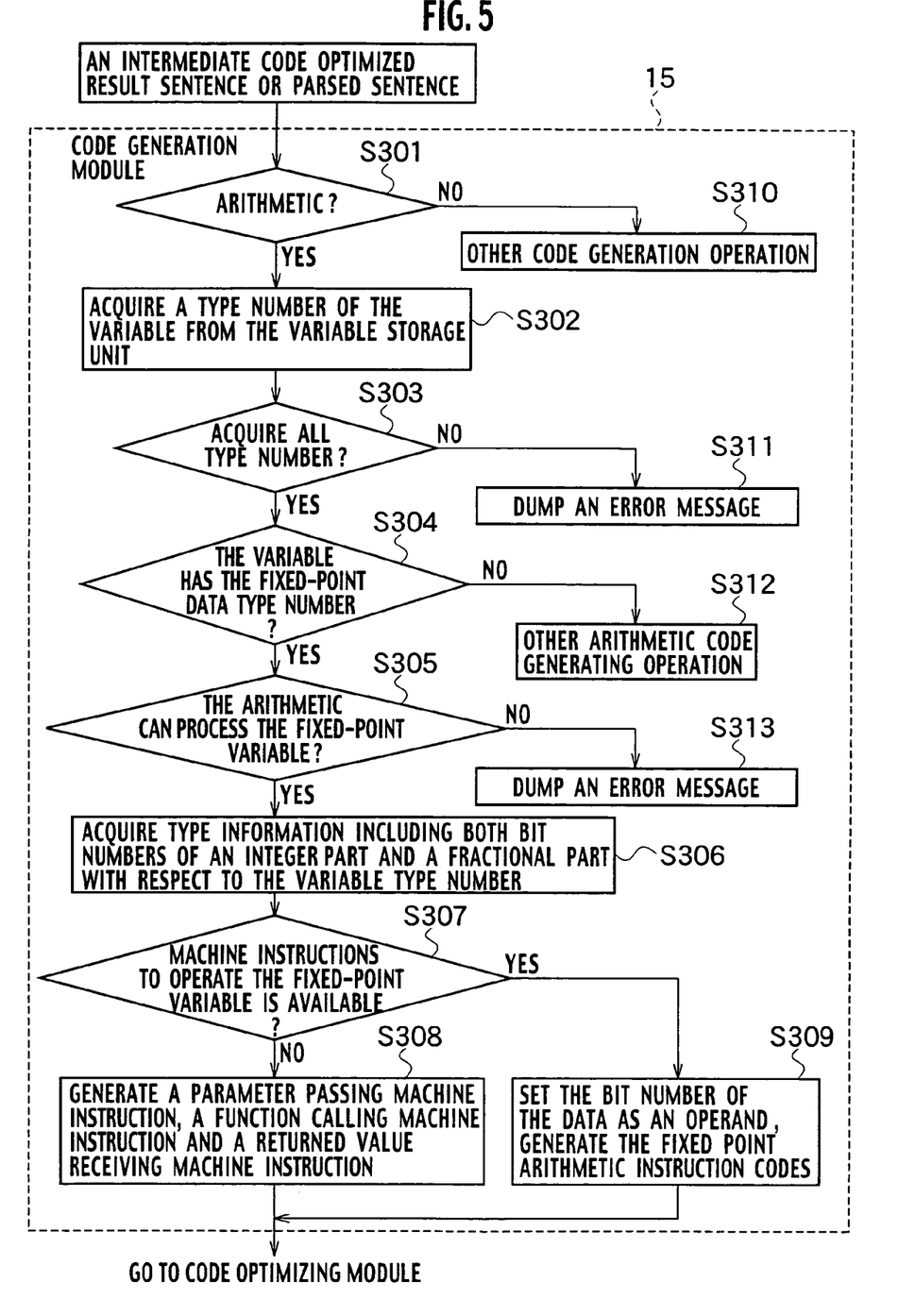
FIG. 5 is a flow chart showing an operation that a code generating module processes the fixed-point operation.

Referring to FIG. 5, an operation of code generating module 15 is explained in detail as follows.

In step S301, the code generating module 15 determines whether or not a sentence of an intermediate code optimized result or a parsed sentence includes the fixed-point data type variable. For example, when there is an arithmetic expression as shown in a line of FIG. 6;

$$x=y+z \tag{3}$$

the code generating module 15 determines whether one of the variables "x", "y" or "z" is the fixed-point data type. If the arithmetic expression includes the fixed-point data type variable, the program proceeds to step S302. If the arithmetic does not includes the fixed-point data type variable, the program proceeds to other code generation operation in step S310.

In step S302, the code generating module 15 acquires a type number of the variable from the variable storage unit 27. If the arithmetic expression does not include the fixed-point data type variable, the arithmetic expression is transferred to another code generation processing unit in step S310.

In step S303, the code generating module 15 determines if all type numbers of the variables of step S302 have being provided from the variable storage unit 27. If all variable type numbers have been provided, the program proceeds to step S304. On the other hand, if all variable type numbers have not been provided, an error message is dumped in step S311.

In step S304, the code generating module 15 determines whether the variable has the fixed-point data type number as shown FIG. 8. If the variable has it, the program proceeds to step S305. On the other hand, if the variable does not have it, the sentence is considered by another arithmetic expression code and another generating operation is provided in step S312.

In step S305, the code generating module 15 determines whether this arithmetic expression can process the fixed-point variable. If the processing is possible, the program proceeds to step S306, on the other hand, if the processing is impossible, a progressing error message is dumped in step S313.

In step S306, the code generating module 15 acquires type-information including both bit numbers of an integral part and a fractional part from the type-information storage unit 26 with respect to the variable type number which is provided at step S302.

In step S307, the code generating module 15 determines whether a machine instruction to operate the fixed-point variable is available, converts the fixed-point expression to either the library function calling instruction or the fixed-point arithmetic instruction.

If the machine instruction to operate the fixed-point variable is not available, the code generating module 15 generates the parameter passing instructions, the function calling instruction, and the instruction which receives the return value in step S308.

Figure 9:
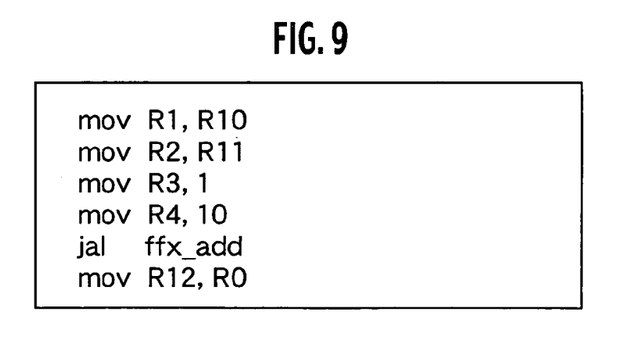
FIG. 9 is an example of an operation library program performed in an embodiment of the present invention.

For example, the code generating module 15 generates an object code for calling sequences of the fixed point arithmetic library (a function) stored in the compiler as shown in FIG. 9.

As object codes, four "mov" instructions from first to fourth lines are the parameter passing machine instructions, which store each operand values of the fixed point arithmetic expression into R10 and R11. A bit number of the integral part is shown by "10", and "1" shows a bit number of the fractional part. The next jal instruction calls a library function, and the last mov instruction receives a return value of the function. The above procedure generates object codes.

When a machine instruction to operate the fixed-point variable has been found, the code generating module 15 sets the bit number of the data as an operand, and generates the fixed point arithmetic instruction codes in Step S309.

The processor, which is subjected to a compiling operation, stores a machine instruction for operating the fixed-point data type data, and codes are generated according to the machine instruction's type. For example, as a machine instruction, the bit number of the fixed-point data is described in an instruction operand as follows; (N1 expresses an integral part bit number, and N2 expresses a fractional part bit number)

$$\text{fadd R0, R1, N1, N2} \qquad (4)$$

When the integral part is 1 bit and the fractional part is 10 bits, an object code of the machine instruction is described as follows;

$$\text{fadd R0, R1, 1,10} \qquad (5)$$

(e) After that, the code optimizing module 16 receives generated codes and sorts the codes in a proper arrangement. The code output module 17 outputs the optimized codes as object codes. The object codes are stored in the object code storage unit 25. In addition, the user-defined fixed point data type information is added as the the following pseudo instruction to the object code:

$$\text{.debugfx,s,1,10} \qquad (6)$$

$$\text{.debugfx,l,2,20} \qquad (7)$$

("s" means "short", "l" means "long")

As an example, a case where CPU 3 refers to a value of the fixed-point type variable x during debugging is described as follows.

A bit pattern of variable x is represented by "0x20000000" when referring to the value, and the fixed-point type bit number of the variable x is represented by "16384.0" as a default value. If a user defines that the integral part is 1 bit and the fractional part is 10 bits, the variable x is "0.5". As thus described, even if decimal values take the same bit pattern, the decimal values are changed with respect to the integral part bit number and the fractional part bit number. However, the debugger can correctly recognize the bit number of the fixed-point, referring to the user-defined, fixed-point type data information in a object code file.

According to the embodiment of the present invention, by adding data type information and variable information to the fixed-point data, the user defined fixed-point data type variable can be described in programs as the other data types' variable. This makes the reading programs easier, improves development efficiency, maintainability, and reusability. Furthermore, by using the fixed-point data type which is suitable for an application, it is possible to generate the object code which has the higher performance and the smaller size.

By adding the user defined fixed-point data type information as the pseudo instruction, the debugger can express its correct value as the decimal number, and this improves the analysis efficiency during debugging.

The arithmetic expression can proceed without a limitation of combination patterns consisting of an integral part and a fractional part of each fixed-point data operant model, it follows that the compiler can generate the object code which has the higher performance and the smaller size.

For example, the default short size's fixed-point data type has the 16 bits length integral part and 15 bits length fractional part. This means that one short size's fixed-point data type variable takes 4 bytes memory. Because the memory needs to have the 1-byte, 2-bytes, 4-bytes, or 8-bytes alignment, if the sum of the number of bits in the integral and fractional part is changed to 15 bits or smaller, then the used memory size is reduced by 2 bytes. If the sum of them is changed to 7 bits or smaller, then it is reduced by 3 bytes.

The default long size's fixed-point data type has the 32 bits length integral part and 31 bits length fractional part. This means that one short size's fixed-point data type variable takes 8 bytes memory. Because the memory needs to have the 1-byte, 2-bytes, 4-bytes, or 8-bytes alignment, if the sum of the number of bits in the integral and fractional part is changed to 31 bits or smaller, then the used memory size is reduced by 4 bytes. If the sum of them is changed to 15 bits or smaller, then it is reduced by 6 bytes. If the sum of them is changed to 7 bits or smaller, then it is reduced by 7 bytes.

For example, in the case that the compiler generates the library function calling instruction for the long size's fixed-point addition, if the 64-bits additional instruction is available, then that fixed-point addition can be executed by one instruction. If the 64-bits additional instruction is not available, then the compiler generates the library function calling instruction which calculates the 64-bits addition. In other words, by changing the sum of the number of bits in the integral and fractional part in the long size's fixed-point data type to 31 bits or smaller, then the performance becomes higher because the compiler needs not to generate the library function calling instruction which calculates 64-bits addition.

Because the processor at which current our compiler targets does not have the 64-bits additional instruction, the compiler generates the 64-bits additional library function calling instruction for the long size's fixed-point addition. The default long size's fixed-point addition takes 49 instructions during execution, however, if the sum of the number of bits in the integral and fractional part in it is changed to 31 bits or smaller, then the long size's fixed-point addition takes 9 instructions during execution.

(Modification 1)

When compiling the source program in FIG. 6, the lexical analysis module 11 as described above obtains the fixed-point data type information from the #pragma directive at the first line in FIG. 6. However, Not all ways of obtaining the fixed-point data type information are this way.

For example, when compiling with such a following option which defines the fixed-point data type, $$cc\ \text{-Xf short:1,10-Xfx long:2,20} \qquad (8)$$

By this description, the fixed-point data type can be defined as a compiler option. When the fixed-point data type is defined as the compiler option, the defined fixed-point data type variable and other data type variables can be described in a program in the same way, which can work the same as the declaration by means of a compiler directive.

Furthermore, when the fixed-point data type is defined by the compiler option, the re-definition is possible without changing the source program. Therefore, the work, that find the smallest number of bits in the integral and fractional part, in a range in which application program executing result is not different from its expected value.

When the number of bits in the fixed-point data type is reduced, the performance becomes higher, and the object code becomes smaller. On the other hand, such a reduction may make a difference between the application program executing result and its expected value. At this point, if the fixed-point data type is defined by the compiler option, then it is possible to continue the re-defining the fixed-point data type, compiling, linking, simulating, and comparing the application program executing result to its expected value without changing the its source program. In other words, it is possible to find the smallest number of bits in the integral and fractional parts of the fixed-point data type used in the application program, without changing its source program. Therefore, users can find the smallest number of bits efficiently.

However, the data type definition by the compiler option changes the data type definition, repeats compiling, linking, simulating and evaluating, which saves the labor of rewriting the source program when the definition is modified. Therefore, an operation demanding the smallest bit number data type definition can work efficiently.

(Modification 2)

Instead of defining the fixed-point data type by the compiler option described in MODIFICATION 1, the fixed-point data type can be defined at the variable declaration as follows;

$$\text{short\_Accum (1,10) x;} \qquad (9)$$

$$\text{long\_Accum (2,20) y;} \qquad (10)$$

The above description can define the fixed-point data type. In the same manner as the embodiment of the present invention, the user defined fixed-point data type variable can be described in programs as the other data types' variable. This makes the reading programs easier, improves development efficiency, maintainability, and reusability. Furthermore, by using the fixed-point data type which is suitable for an application, it is possible to generate the object code which has the higher performance and the smaller size.

Second Embodiment

In generally, the C language specification says that the largest operand's accuracy is supposed to be adopted when the accuracies of one operand and the other in the arithmetic expression are different. For example, when one operand is float type and the other is double type in one expression, the float type's operand is casted to the double type before executing the expression.

In consideration of the above, in the second embodiment of the present invention, the code generating module 15a compares each bit number of the fixed point arithmetic operands. When the bit numbers are different, the smaller precision operand of the fixed-point type is converted into a larger precision operand.

The system equipment and the processing procedure are the same as that shown in FIG.1 and FIG.2. Therefore, the explanations thereof are omitted.

Figure 11:
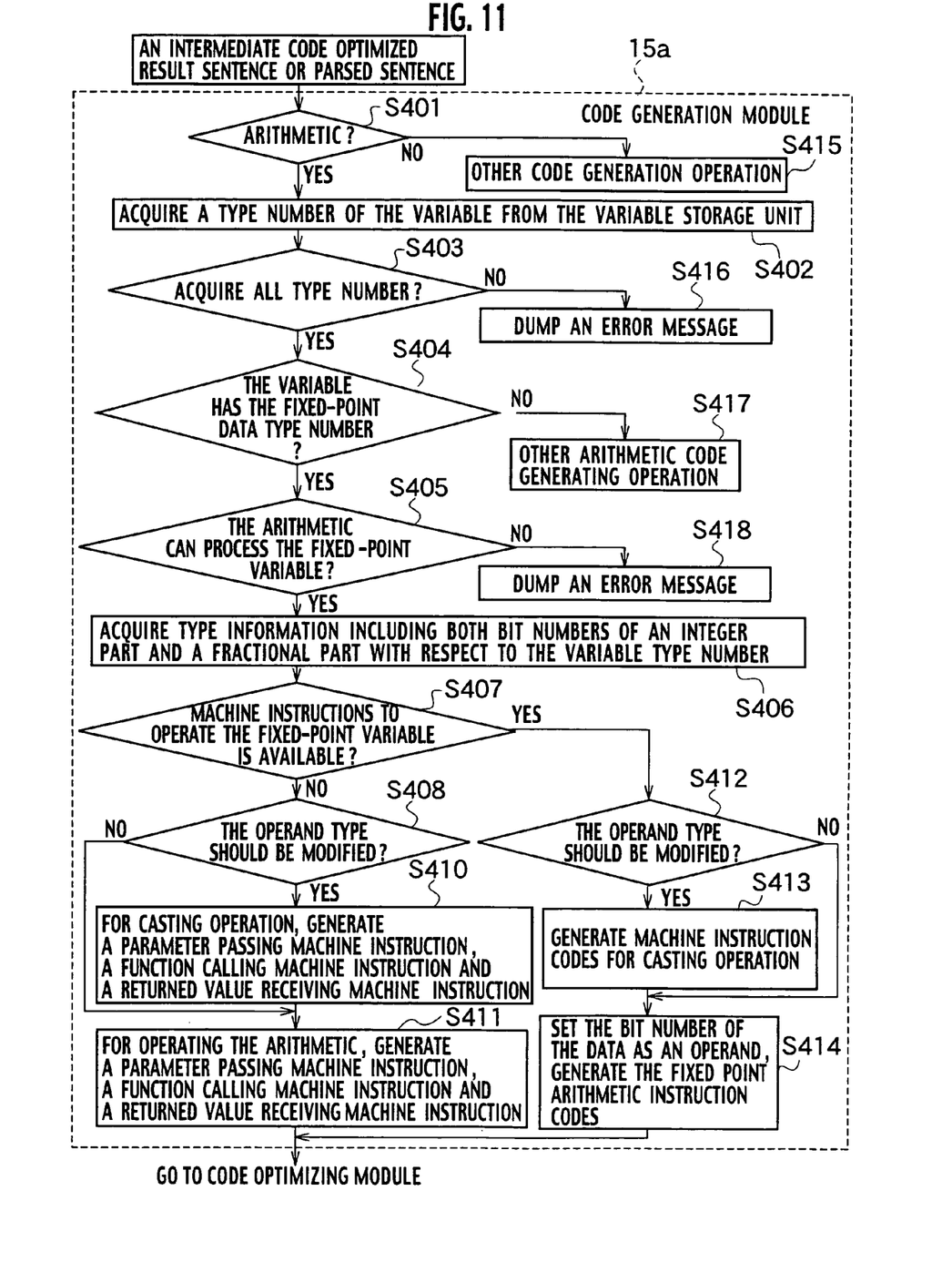
FIG. 11 is a flow chart showing an operation in which a code generating module processes an operation of the fixed-point.

Next, an operation of code generating module 15a is explained referring to a flow diagram of FIG. 11. the operation of step S401 . . . step S407 is the same as step S301 . . . S307, and the operation of step S415 . . . step S418 is the same as step S310 . . . S313. Therefore, the steps explanations are omitted.

(a) In step S407, when a machine instruction for operating the fixed-point variable is found, the code generating module 15a compares the bit numbers of the fixed point arithmetic operands, and determines whether the operand type should be converted.

For example, for the fixed point arithmetic expression "a+b", the operand "a" has a 1-bit integral part and 10-bit fractional part, the operand "b" has 2-bit integral part and 20-bit fractional part, the operand "a" type should be casted to the operand "b" type before the adding operation "+".

Because the fixed-point data type of operand "b" has the larger precision than that of operand "a".

If operand type casting is necessary, the program proceeds to step S410. On the other hand, if operand type converting is not necessary, the program proceeds to step S411.

(b) In step S410, the code generating module 15 generates the parameter passing instructions, the function calling instruction, and the instruction which receives the return value for the operand type casting.

In step S411, the code generating module 15 generates the parameter passing instructions, the function calling instruction, and the instruction which receives the return value for the fixed-point expression. The generated codes are passed to the code optimizing module 16.

(c) If a machine instruction for operating the fixed-point variable is not found in step S407, in step S412, the code generating module 15a compares the bit number of the fixed point arithmetic operand, and determines whether the operand type should be casted.

If casting is necessary, the program proceeds to step S413. On the other hand, if casting is not necessary, the program proceeds to step S414.

(d) In step S413, the code generating module 15a generates codes comprised of machine instructions for casting the operand type.

In step S414, the code generating module 15a sets the bit number of data as an operand, and generates the fixed point arithmetic instruction codes.

In the case that the one operand does not have the higher precision than the other though the number of bits in the fixed-point data type of the fixed-point data operand in a expression is different, for example, in the case that the one operand (A) has more bits in the integral part than the other operand (B) and the operand B has more bits in the fractional part than the operand A, the compiling system 100 generates the new fixed point data type which has the same bits as A in the integral part and the same bits as B in the fractional part, and instructions to cast both operands in the expression to the new fixed-point type before the fixed-point expression.

As an example for the fixed point arithmetic expression "c+d", the operand "c" has a 1-bit integral part and 20-bit fractional part, the operand "d" has a 2-bit integral part and 10-bit fractional part, the compiling system 100 generates a new fixed-point type operand having a 2-bit integral part and 20-bit fractional part, and both of the operands "c" and "d" are casted to the new operand type before the adding operation ("+").

According to the second embodiment of the present invention, even if the bit number is changed by a user, the compiling system 100 selects the higher precision integral part bit number and/or fractional part bit number, and can generate a machine instruction for casting data type as necessary before operating the arithmetic expression. Furthermore, when the casted data type is undefined by a user, the compiling system 100 can generate the data type.

Various modifications will become possible for those skilled in the art after receiving the teachings of the present disclosure without departing from the scope thereof. The present disclosure is therefore to be considered in all illustrative and not restrictive, the scope of the present invention being indicated by the appended claims rather than by the foregoing description, and all changes which come within the meaning and range of equivalency of the claims are therefore intended to be embraced therein.

What is claimed is:

1. A system for compiling source programs into machine language programs, comprising:
    a data type information processing module configured to analyze a definition statement of a fixed-point data type in a source program, acquire data type information of the fixed-point data type, including at least one of a type number, a data type, a sign, a data size, a number of bits in an integral part and fractional part;
    a type-information storage unit configured to store the data type information;
    a variable information processing module configured to analyze a variable declaration statement of the fixed-point data type, acquire variable information including a variable name and the type number as an analysis result;
    a variable storage unit configured to store the variable information, each variable name being indexed by the type number and being linked to the data type information stored in the type-information storage unit; and
    a code generating module configured to read arithmetic expression data including the variable in the source program, acquire the type number corresponding to the variable from the variable storage unit, acquire the data type information corresponding to the type number from the type-information storage unit, and convert the arithmetic expression data including the data type information into machine language of the function calling instruction or the fixed point arithmetic instruction installed in a processor.

2. The system of claim 1, wherein the definition statement of the fixed-point data type is described by at least one of a compiler directive, a compiler option, or the variable declaration in the source program.

3. The system of claim 1, wherein the code generating module
    compares operand types of a first fixed-point data and a second fixed-point data which are included in the arithmetic expression before converting the arithmetic expression of the fixed-point data type into a machine language;
    generates a new fixed-point data operand type which is adjusted to the greater bit-number integral part and the greater bit-number fractional part within the operand types, when the integral part of one operand (A) is bigger than that of the other operand (B) and the fractional part of the operand B is bigger than that of the operand A, or the integral part of the operand B is bigger than that of the operand A and the fractional part of the operand A is bigger than that of the operand B; and
    converts the operand types into the new fixed-point data operand type.

4. The system of claim 1, wherein the definition statement of the fixed-point data type can be added as debugging information in object codes which are compiled by the source program.

5. The system of claim 1, wherein the integral part bit number and the fractional part bit number of the fixed-point data type are passed as parameters for run-time routines for the fixed-point data in a run-time library.

6. The system of claim 1, wherein the definition statement of the fixed-point data type can be a mix of a default fixed-point data type and a user-defined fixed-point data type which is defined by at least one of a compiler directive, a compiler option, and the variable declaration in the source program.

7. A computer implemented method for compiling source programs into machine language programs, comprising:

analyzing a definition statement of a fixed-point data type in a source program, acquiring data type information of the fixed-point data type including at least one of a type number, a data type, a sign, a data size, a number of bits in an integral part and fractional part, and storing the data type information in a type-information storage unit;

analyzing a variable declaration statement of the fixed-point data type, acquiring variable information including a variable name and the type number as a result of the analyzing, and storing the variable information in a variable storage unit, each variable name being indexed by the type number and being linked to the data type information stored in the type-information storage unit; and reading arithmetic expression data including the variable in the source program, acquiring the type number corresponding to the variable from the variable storage unit, acquiring the data type information corresponding to the type number from the type-information storage unit, and converting the arithmetic expression data including the data type information into machine language of a function calling instruction or the fixed point arithmetic instruction installed in a processor.

8. The method of claim 7, wherein the definition statement of the fixed-point data type describes at least one of a compiler directive, a compiler option or the variable declaration in the source program.

9. The method of claim 7, wherein a code generating module compares operand types of a first fixed-point data and a second fixed-point data which are included in the arithmetic expression before converting the arithmetic expression of the fixed-point data type into a machine language;

generates a new fixed-point data operand type which is adjusted for the greater bit-number integral part and the greater bit-number fractional part within the operand types, when the integral part of one operand (A) is bigger than that of the other operand (B) and the fractional part of the operand B is bigger than that of the operand A, or the integral part of the operand B is bigger than that of the operand A and the fractional part of the operand A is bigger than that of the operand B; and converts the operand types into the new fixed-point data operand type.

10. The method of claim 7, wherein the definition statement of the fixed-point data type can be added as debugging information in object codes which are compiled by the source program.

11. The method of claim 7, wherein the integral part bit number and the fractional part bit number of the fixed-point data type are passed as parameters for run-time routines for the fixed-point data in a run-time library.

12. The method of claim 7, wherein the definition statement of the fixed-point data type can be a mix of a default fixed-point data type and a user-defined fixed-point data type which is defined by at least one of a compiler directive, a compiler option, and the variable declaration in the source program.

13. A computer program product configured to compile source programs into machine language programs within a computer system, the computer program product comprising:

an instruction configured to analyze a definition statement of a fixed-point data type in a source program, acquire data type information of the fixed-point data type, including at least one of a type number, a data type, a sign, a data size, a number of bits in an integral part and fractional part, and store the data type information in a type-information storage unit;

an instruction configured to analyze a variable declaration statement of the fixed-point data type, acquire variable information including a variable name and the type number as a result of the analyzing, and store the variable information in a variable storage unit, each variable name being indexed by the type number and being linked to the data type information stored in the type-information storage unit; and an instruction configured to read arithmetic expression data including the variable in the source program, acquire the type number corresponding to the variable from the variable storage unit, acquire the data type information corresponding to the type number from the type-information storage unit, and convert the arithmetic expression data including the data type information into machine language of a function calling instruction or the fixed point arithmetic instruction installed in a processor.

14. The product of claim 13, wherein the definition statement of the fixed-point data type is described by at least one of a compiler directive, a compiler option or the variable declaration in the source program.

15. The product of claim 13, wherein a code generating module is configured to compare operand types of a first fixed-point data and a second fixed-point data which are included in the arithmetic expression before converting the arithmetic expression of the fixed-point data type into a machine language;

generate a new fixed-point data operand type which is adjusted for the greater bit-number integral part and the greater bit-number fractional part within the operand types, when the integral part of one operand (A) is bigger than that of the other operand (B) and the fractional part of the operand B is bigger than that of the operand A, or the integral part of the operand B is bigger than that of the operand A and the fractional part of the operand A is bigger than that of the operand B; and convert both operand types into the new fixed-point data operand type.

16. The product of claim 13, wherein the definition statement of the fixed-point data type can be added as debugging information in object codes which are compiled by the source program.

17. The product of claim 13, wherein the integral part bit number and the fractional part bit number of the fixed-point data type are passed as parameters for run-time routines for the fixed-point data in a run-time library.

18. The product of claim 13, wherein the definition statement of the fixed-point data type can be a mix of a default fixed-point data type and a user-defined fixed-point data type which is defined by at least one of a compiler directive, a compiler option, and the variable declaration in the source program.

* * * * *